United States Patent
Lee et al.

(10) Patent No.: US 8,237,877 B2
(45) Date of Patent: Aug. 7, 2012

(54) TOUCH PANEL AND TOUCH-PANEL DEVICE

(75) Inventors: Hsin-Hung Lee, Hsin-Chu (TW);
Mei-Sheng Ma, Hsin-Chu (TW);
Yuan-Chun Wu, Hsin-Chu (TW);
Kuo-Hsing Cheng, Hsin-Chu (TW);
Jia-Lang Hsu, Hsin-Chu (TW); Pei-Yu Chen, Hsin-Chu (TW); Yao-Jen Hsieh, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 940 days.

(21) Appl. No.: 12/268,388

(22) Filed: Nov. 10, 2008

(65) Prior Publication Data
US 2009/0225047 A1   Sep. 10, 2009

(30) Foreign Application Priority Data
Mar. 10, 2008   (TW) ................ 97108308 A

(51) Int. Cl.
*G02F 1/1335*   (2006.01)

(52) U.S. Cl. ........... 349/12; 349/139; 349/155; 345/173

(58) Field of Classification Search .............. 349/12, 349/139, 138, 43, 155, 153; 345/173
See application file for complete search history.

(56) References Cited

U.S. PATENT DOCUMENTS

| | | | |
|---|---|---|---|
| 6,529,188 B1 | 3/2003 | Suzuki | |
| 7,292,304 B2 | 11/2007 | Kim et al. | |
| 2008/0117182 A1* | 5/2008 | Um et al. | 345/173 |

FOREIGN PATENT DOCUMENTS

CN   101109859 A   1/2008

* cited by examiner

*Primary Examiner* — Thoi Duong
(74) *Attorney, Agent, or Firm* — Winston Hsu; Scott Margo

(57) ABSTRACT

A touch panel includes two substrates, a sealant positioned between the substrates, a liquid crystal layer disposed between the substrates and enclosed by the sealant, and a first and a second sensing zones disposed on the substrate, wherein the first sensing zone is enclosed by the second sensing zone, and the second sensing zone is enclosed by the sealant. The first and second sensing zones have at least a first sensor and at least a second sensor respectively. The first sensor has a first sensor gap, and the second sensor has a second sensor gap smaller than the first sensor gap.

28 Claims, 6 Drawing Sheets

TOUCH PANEL AND TOUCH-PANEL DEVICE

BACKGROUND OF THE INVENTION

1. Field of the Invention

The present invention relates to a touch panel, and more particularly, to a flat display panel with touch control function.

2. Description of the Prior Art

Currently, in the market of various kinds of consumer electronic products, touch panels have been widely applied in portable electronic devices such as personal digital assistants (PDA), mobile Phones, and notebooks for serving as the interface of information communication tool between the users and the electronic devices. Since modern electronic products increasingly become smaller, thinner, and lighter, the display with a touch panel has gradually become the key component of various electronic products in order to save space and to replace traditional input apparatuses, such as operation buttons, keyboard, and mouse, leaning on the trend of requirement of human-based designed flat computer.

A conventional touch panel is an individual touch control device, which may be fixed on the surface of a display panel or a display device. The conventional touch panel commonly has a conductive glass substrate, a conductive film disposed on the conductive glass substrate, and a plurality of spacers positioned between the conductive glass substrate and the conductive film. A transparent conductive layer is disposed on the opposite surfaces of the conductive glass substrate and the conductive film respectively, which may be electrically connected to a conductive wire and to an external control circuit through a flexible circuit board. According to the operation method of the conventional touch panel, when the user presses or touch the conductive film on the surface of the panel with his finger, the pressed point will have a voltage variation such that the location of the pressed point can be calculated in accordance with the quantity of voltage variation. Sequentially, an input signal representing the location of the pressed point can be transferred through the transparent conductive layer, conductive wire, and the flexible circuit board.

However, the above mentioned conventional touch panel is additionally attached on the display panel. Since the touch panel itself has a certain thickness, it reduces the light transparency and influence the light performance of the display device, and the combination of the display panel and the touch panel increases the total thickness of the display device. In addition, the conventional touch panel only supports the method of single touch for sensing the touch-generating input signal, which means only one pressed location or point can be sensed. Therefore, multi touch control is not accepted by the conventional touch panel, such that the application field of the conventional touch panel is restricted.

On another aspect, the manufacturers have developed to integrate the touch control function with the liquid crystal display (LCD) panel. Accordingly, when the surface of the liquid crystal display panel is being pressed, its upper glass substrate will be deformed so as to produce sensing signals. Generally, an LCD panel usually comprises a sealant or fiber spacers disposed in the periphery portion between the glass substrates in order to support the spacing or cell gap of the liquid crystal layer. However, the periphery portion of the glass substrates near the sealant is hard to be deformed because the sealant has a high rigidity. Accordingly, more power has to be provided for deforming the glass substrate when applying active force onto the glass substrate near the sealant in order to produce the sensing signal. For example, according to the operation of the conventional display panel having touch control function, probably an active force of only 20 grams is needed for pressing the central portion of the display panel to produce a sensing signal. However, when pressing the periphery portion of the display panel, an active force of more than 100 grams is needed for deforming the glass substrate near the periphery portion to produce the sensing signal, which is five times more than the active force of the central portion. In this situation, a user may feel that the sensitivity of the periphery portion is comparatively worse because only a big active force can produce the control signal in the periphery portion of the display, which is not convenient for use and also limits the function of the display panel.

As the above mentioned, since the conventional type of touch panel has disadvantages of raising the total thickness, lowering the lightness of the display device and un-uniform touch condition, the manufacturers of touch panel and display device have to research and develop new integrated products with properties of light, small, good sensitivity, and low fabrication cost.

SUMMARY OF THE INVENTION

It is one of the primary objectives of the present invention to provide a flat display panel with touch control function that has sensor structures with different sensor gaps, so as to solve the above-mentioned problem of the prior art touch panel, which is bulky and has poor sensing performance.

According to the present, a touch panel is provided. The touch panel comprises a first substrate and a second substrate parallel to the first substrate, a sealant disposed between the first substrate and the second substrate, and a liquid crystal layer disposed between the first substrate and the second substrate and enclosed by the sealant. The first substrate and the second substrate have a first sensing zone and a second sensing zone that encloses the first sensing zone. The sealant encloses the second sensing zone and is positioned out of the second sensing zone. The present invention touch panel further comprises at least a first sensor structure and at least a second sensor structure, respectively disposed in the first sensing zone and the second sensing zone between the first substrate and the second substrate, wherein the first sensor structure has a first sensor gap, and the second sensor structure has a second sensor gap smaller than the first sensor gap.

It is an advantage of the present invention touch panel that the touch panel is integrated with a flat display panel, the total fabrication cost and volume of the flat display device can be reduced to meet the market requirement of lightening and minimizing electronic products. In addition, the present invention touch panel comprises sensor structures with different sensor gaps, thus only a little deformation of the glass substrate is needed to produce the sensing current when operating the portion with sensor structures having small sensor gaps. Accordingly, the present invention touch panel has an advantage that the active force or touch force for controlling the panel in every part of the panel can be uniformed in accordance with the whole design of the flat display panel, so as to improve the total sensing performance of the touch panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
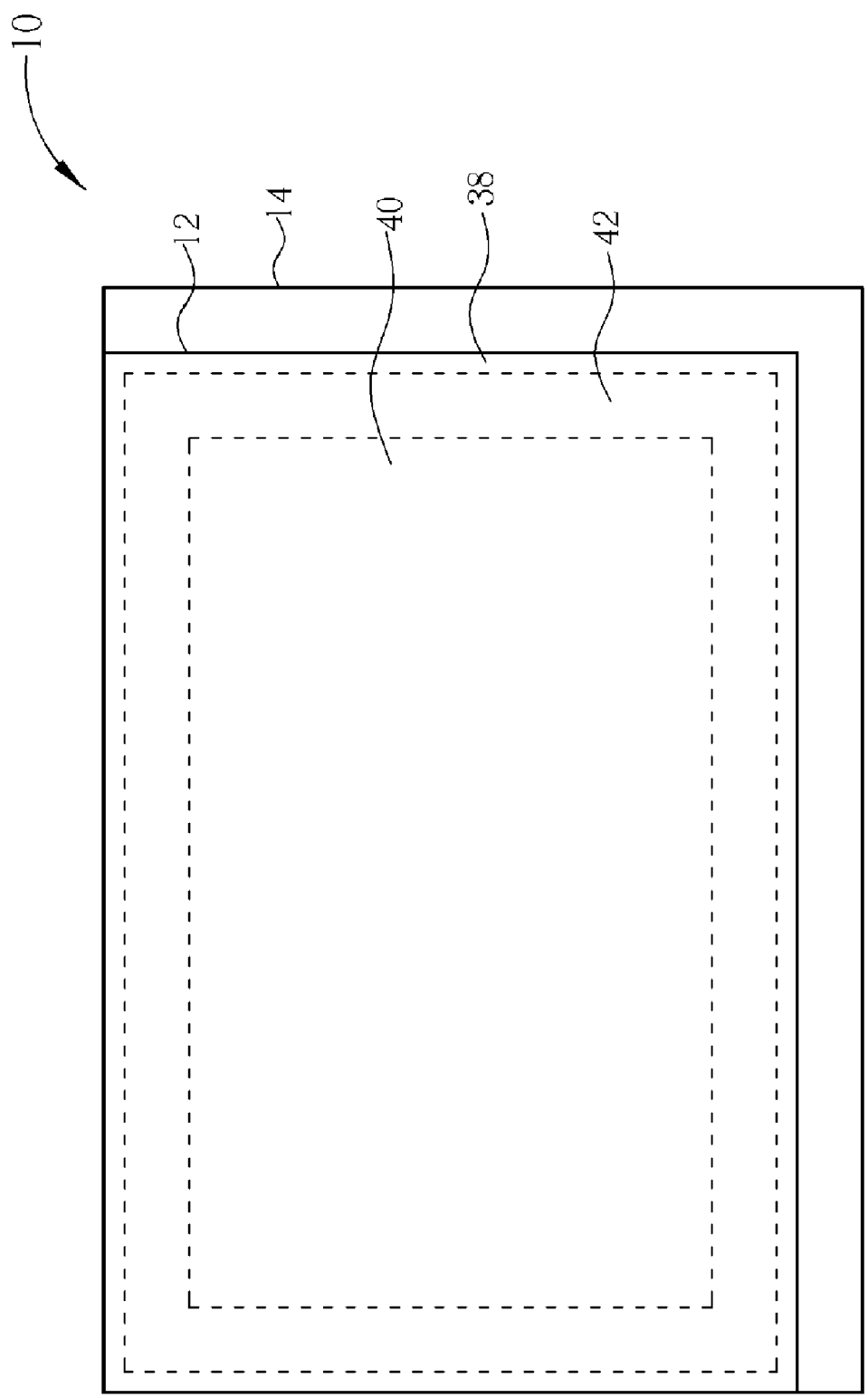
FIG. 1 is a schematic diagram of top view of an in-cell touch panel of the present invention.
Figure 2:
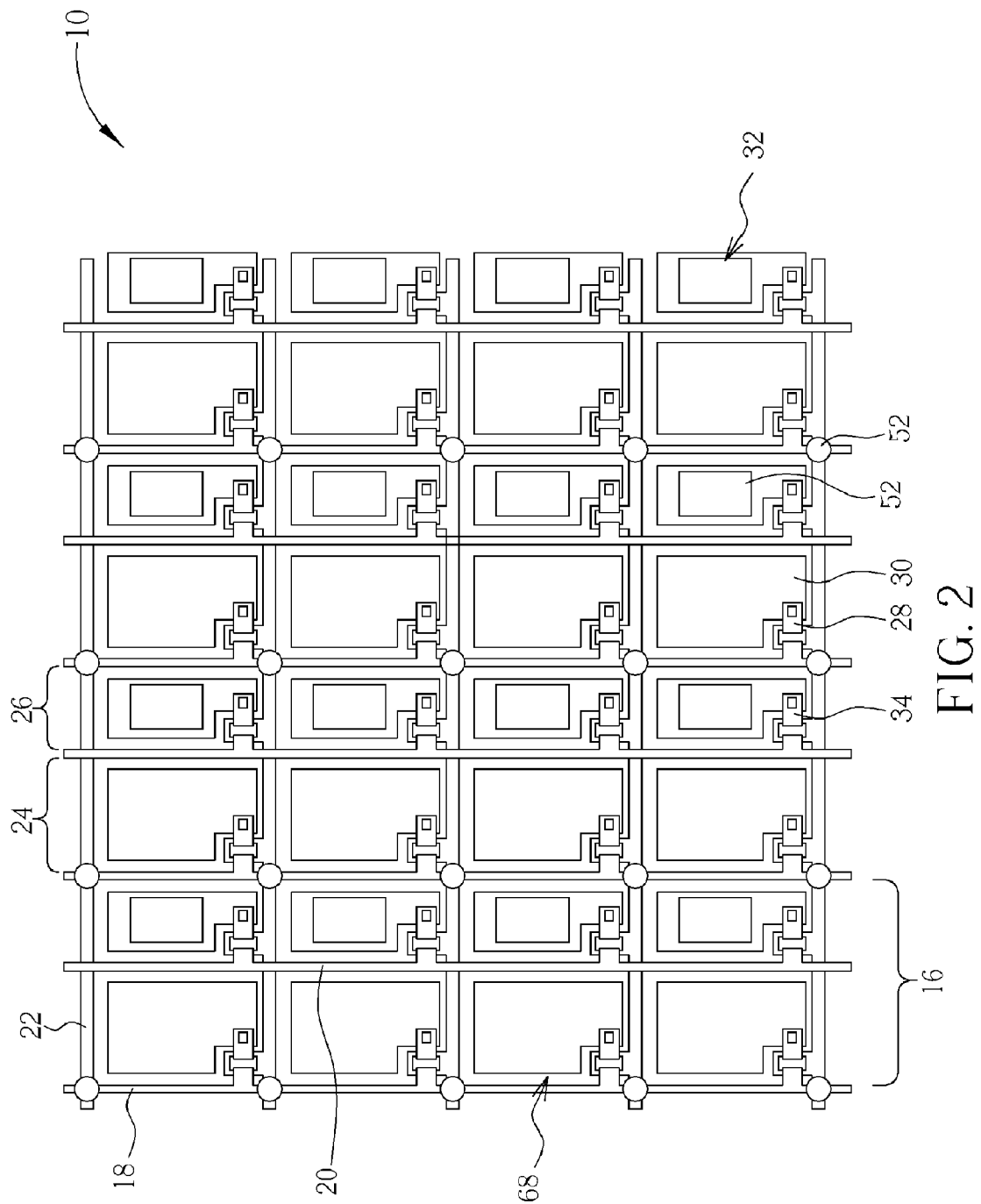
FIG. 2 is a schematic diagram of the arrangement of partial elements of the in-cell touch panel shown in FIG. 1.
Figure 3:
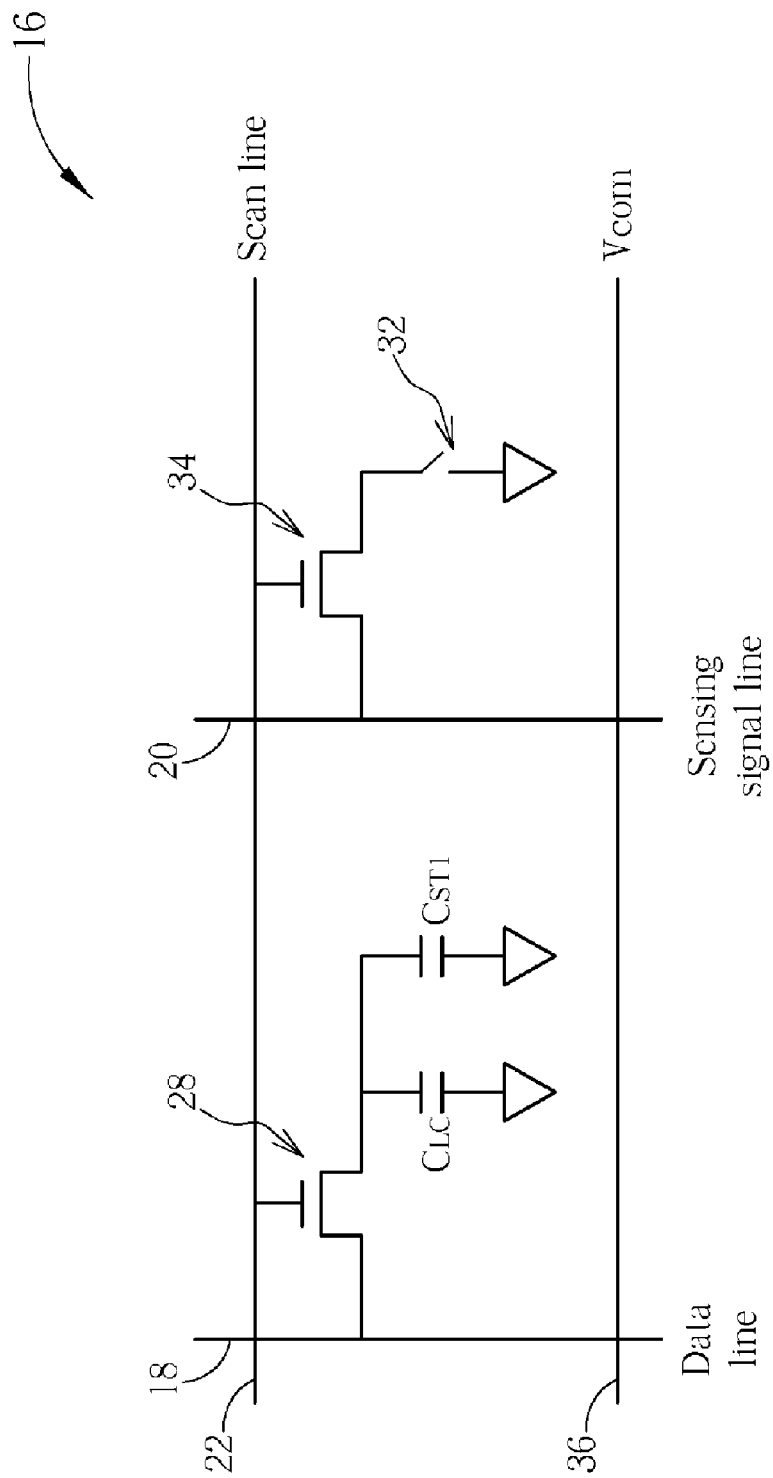
FIG. 3 is an equivalent circuit diagram of the in-cell touch panel according to the present invention.

FIG. 1 to FIG. 3 are schematic diagrams of an in-cell touch panel (integrated touch panel) 10 according to a first embodiment of the present invention, wherein FIG. 1 is a top view of the in-cell touch panel 10 of the present invention, FIG. 2 shows the arrangement of partial elements of the in-cell touch panel 10 shown in FIG. 1, and FIG. 3 is an equivalent circuit diagram of the in-cell touch panel 10. The in-cell touch panel 10 of the present invention is a flat panel having touch control and display functions at the same time. In this embodiment, a multi-touch control device is integrated in an LCD panel. The in-cell touch panel 10 comprises a first substrate 12, a second substrate 14, and a liquid crystal layer 48 positioned between the first substrate 12 and the second substrate 14. The first substrate 12 and the second substrate 14 are preferably formed with glass or quartz materials, and are fixed with a sealant located between the both substrates. Wherein, the first substrate 12 generally has a smaller size, and the sealant is disposed in the periphery portion of a lower surface of the first substrate 12. The sealant region 38 is shown in FIG. 1.

In addition, the overlap portion of the first substrate 12 and the second substrate 14 is defined as display regions of the in-cell touch panel 10, whose element arrangement is illustrated as an enlarge schematic diagram in FIG. 2 while the equivalent circuit diagram is shown in FIG. 3. The in-cell touch panel 10 comprises a plurality of display regions 68 and a plurality of pixels 16 disposed in the display regions 68, wherein each pixel 16 includes at least a data line 18 and a sensing signal line (signal readout line) 20 perpendicular to at least a scan line 22. Moreover, each pixel 16 further comprises an image pixel area 24 and a touch sensing area 26. Each image pixel area 24 has a thin film transistor (TFT) 28, a liquid crystal capacitor $C_{LC}$ and a first storage capacitor $C_{ST1}$ (shown in FIG. 3), wherein the drain of the TFT 28 is electrically connected to a pixel electrode 30. The main function of the image pixel area 24 includes transferring image signals from the corresponding data line 18, through the TFT 28 to the pixel electrode 30 in order to form an electric field by cooperating with the common electrode Vcom 36 to enable liquid crystal molecules to rotate for displaying images. Each touch sensing area 26 has a sensor structure 32 and a TFT 34, wherein the sensor structure 32 includes a portion of the common electrode 36 disposed in the inner surface of the first substrate 12. When an active force is applied onto the first substrate 12, the common electrode 36 of the touched portion on the first substrate 12 contacts the electric element on the second substrate 14 to produce the sensing signal, which is transferred through the TFT 34 to the sensing signal line 20 to control the in-cell touch panel 10, as shown in FIG. 3. In addition, a plurality of photoresist spacers 52 are disposed between the first substrate 12 and the second substrate 14, inside the pixels 16 or between the pixels 16 in order to support the cell gap of the first substrate 12 and the second substrate 14 for containing the liquid crystal layer.

As mentioned above, in the conventional in-cell touch panel, more active force is needed for downward deforming the first substrate 12 to produce sensing signals when the touched point is closer to the periphery portion. In contrast, the in-cell touch panel of the present invention provides a plurality of sensing zones with different sensor gaps in the display regions. Referring to FIG. 1, the in-cell touch panel 10 of this embodiment includes a first sensing zone 40 and a second sensing zone 42, defined on the first substrate 12 and the second substrate 14, wherein the second sensing zone 42 encloses the first sensing zone 40, but is enclosed by the sealant region 38. However, in different embodiments, the second sensing zone 42 may not enclose the first sensing zone 40 but only be disposed at an out side of the first sensing zone 40, which means the second sensing zone 42 is closer to the sealant region 38 than the first sensing zone 40.

Figure 4:
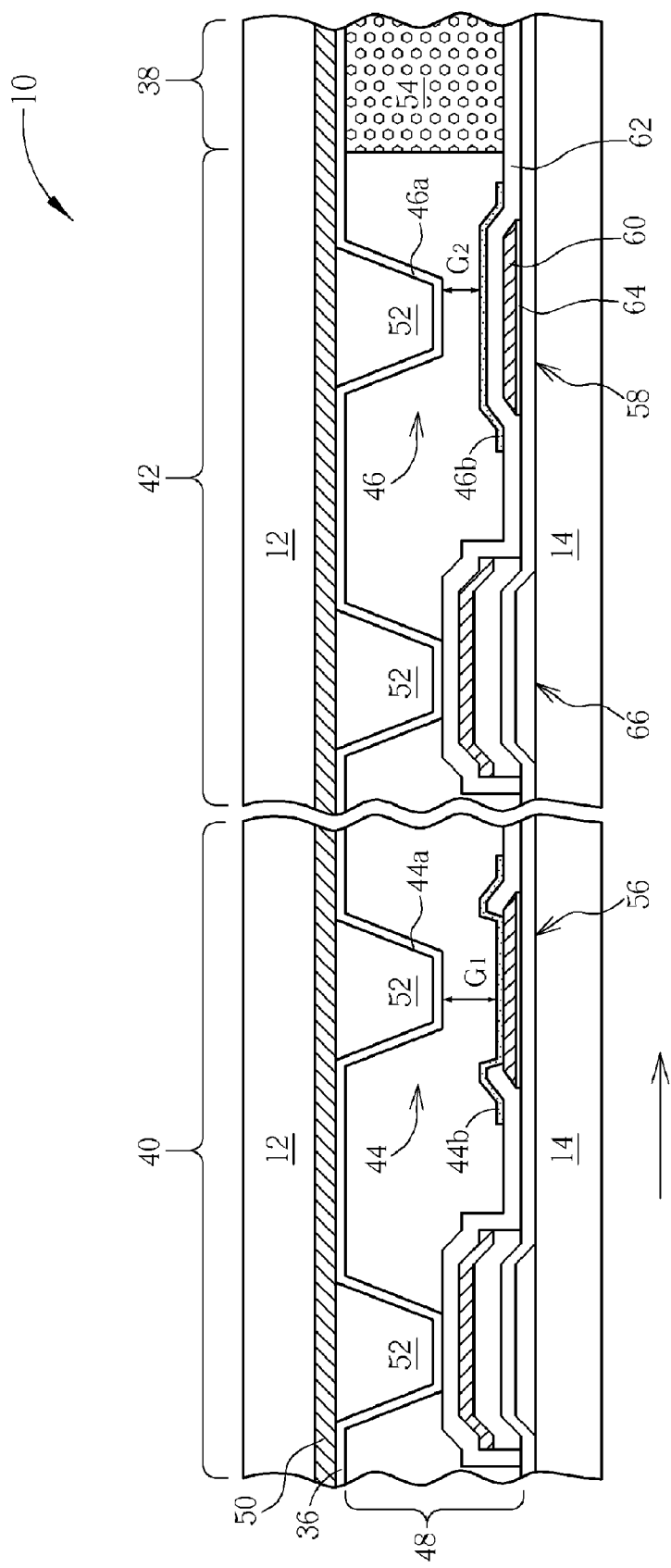
FIG. 4 is a schematic diagram of sectional view of a portion of the in-cell touch panel shown in FIG. 1.

FIG. 4 is a schematic diagram of sectional view of a portion of the in-cell touch panel shown in FIG. 1, wherein the direction pointed by the arrow represents the direction from the central to the periphery of the in-cell touch panel 10. The lower surface of the first substrate 12 comprises a common electrode 36 covering the surfaces of the photoresist spacers 52 and preferably comprising a transparent conductive layer. In addition, since the in-cell touch panel 10 comprises the first sensing zone 40 and the second sensing zone 40, it also comprises two kinds of sensor structures: the first sensor structures 44 and the second sensor structures 46 respectively disposed in the first sensing zone 40 and the second sensing zone 42 between the first substrate 12 and the second substrate 14. Each first sensor structure 44 comprises a first upper sensing electrode 44a and a first lower sensing electrode 44b, wherein the first upper sensing electrode 44a is a portion of the common electrode 36, and the first lower sensing electrode 44b comprises a transparent conductive layer, which may be formed with the same material with that of the pixel electrode 30. The first upper sensing electrode 44a and the first lower sensing electrode 44b having a spacing defined as the first sensor gap $G_1$ of the first sensor structure 44. Similarly, each second sensor structure 46 comprises a second upper sensing electrode 46a and a second lower sensing electrode 46b. The second upper sensing electrode 46a comprises a portion of the common electrode 36, while the second lower sensing electrode 46b comprises a transparent conductive layer. The spacing between the second upper sensing electrode 46a and the second lower sensing electrode 46b is defined as the second sensor gap $G_2$ of the second sensor structure 46. The second sensing zone 42 is disposed adjacent to the sealant region 38, and the sealant 54 in the sealant region 38 is made of a rigid material or a low plastic material, resulting in that it is difficult to deform the first substrate 12 in the second sensing zone 42. Accordingly, the present invention provides a second sensor gap $G_2$ of the second sensor structure 46 smaller than the first sensor gap $G_1$ of the first sensor structure 44 so as to uniform required active forces for inputting control signals by touching the first substrate 12 of the first sensing zone 40 and the second sensing zone 42.

In order to form the above-mentioned second sensor gap $G_2$, a little smaller than the first sensor gap $G_1$, the present invention in-cell touch panel 10 further comprises a plurality of first pad structures 56 and a plurality of second pad structures 58, respectively disposed in the first sensing zone 40 and the second sensing zone 42 between the first substrate 12 and the second substrate 14. Each of the first pad structures 56 and each of the second pad structures 58 respectively correspond one first sensor structure 44 and one second sensor structure 46. Each first pad structure 56 or second pad structure 58 is composed with one or several thin films, which may comprise the doped material layer 64, the metal conductive layer 60, or the passivation layer 62. However, the second pad structure 58 contains more thin-film layers or thicker thin films than the first pad structure 56, thus the total thickness of the second pad structure 58 is thicker than that of the first pad structure 56. In this embodiment, the second pad structure 58 containing the doped material layer 64, the metal conductive layer 60 and the passivation layer 62 has a larger thickness than the first pad structure 56 not containing the passivation layer 62. In addition, since the transparent conductive layers composing the first lower sensing electrode 44b and the second lower sensing electrode 46b are respectively disposed on the surfaces of the first and the second pad structures 56, 58, the second lower sensing electrode 46b locates on a higher horizontal level on the second substrate 14 than the first lower sensing electrode 44b. As a result, although the first and the second upper sensing electrodes 44a, 44b are both disposed on the surfaces of the photoresist spacers 52 with the same thickness, the second sensor gap $G_2$ is smaller than the first sensor gap $G_1$ because the second lower sensing electrode 46b and the second upper sensing electrode 46a have a smaller distance, resulted from the higher horizontal level of the second lower sensing electrode 46b. Accordingly, only smaller active force is needed to apply onto the second substrate 12 to make the second upper sensing electrode 46a contact the second lower sensing electrode 46b for producing sensing signals.

Furthermore, the present invention in-cell touch panel 10 further comprises a black matrix layer 50 disposed on the lower surface of the first substrate 12, covered by the common electrode 36, and a plurality of thin-film layers disposed on the upper surface of the second substrate 14 for composing the TFTs 28, 34 and the first and the second pad structures 56, 58. The liquid crystal layer 48 of the present invention in-cell touch panel 10 is disposed between the first substrate 12 and the second substrate 14, enclosed by the sealant 54. In addition, the present invention in-cell touch panel 10 further comprises a plurality of supporting structures 66 disposed between the first substrate 12 and the second substrate 14, which includes the photoresist spacers 52 on the surface of the first substrate 12 and the pluralities of stacked thin-film layers on the second substrate 14. Since the common electrode 36 on the surface of the photoresist spacers 52 and its below thin-film layers contact with each other, a fixed cell cap between the first substrate 12 and the second substrate 14 is provided. In addition, a plurality of sub-supporting structures (not shown) may alternatively disposed near the supporting structures 66, which may have similar structures with the supporting structures 66 but whose photoresist spacers on the surface of the first substrate 12 do not contact the second substrate 14 or the thin films thereon. In this situation, only when the first substrate 12 is pressed to be deformed, the photoresist spacers of the sub-supporting structures contact the second substrate 14 for enhancing the supporting performance.

Figure 5:
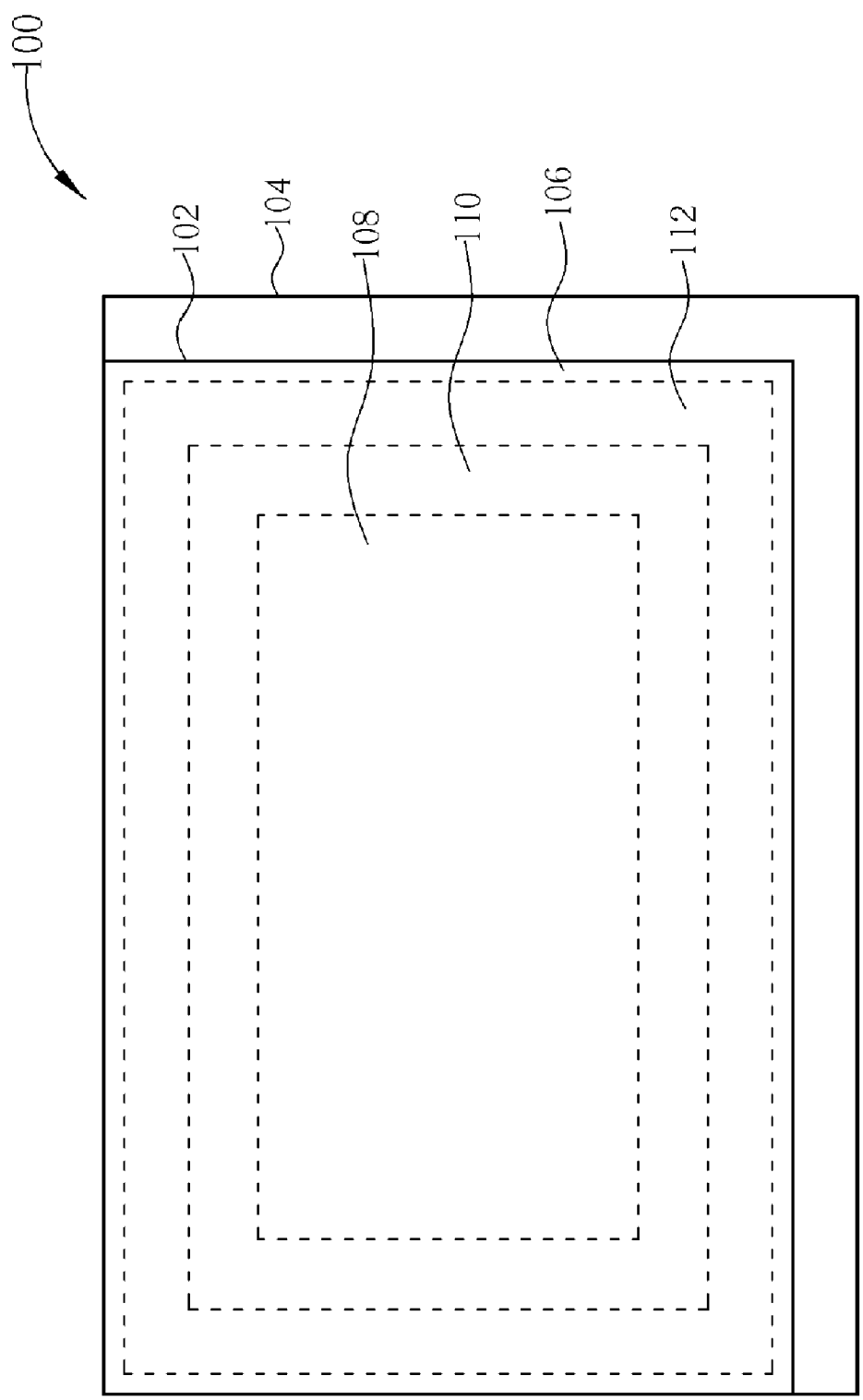
FIG. 5 is a schematic diagram of top view of an in-cell touch panel according to a second embodiment of the present invention.
Figure 6:
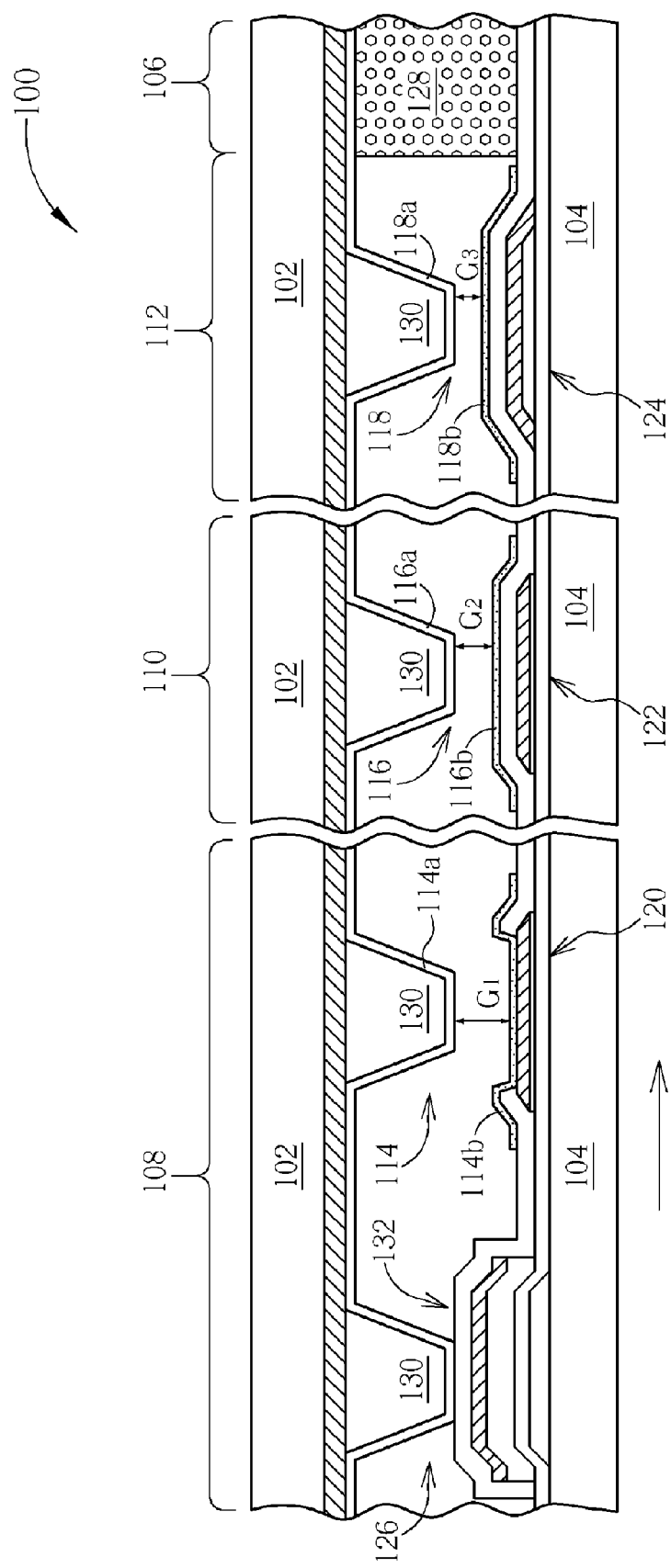
FIG. 6 is a schematic diagram of sectional view of a portion of the in-cell touch panel shown in FIG. 5.

Referring to FIG. 5 and FIG. 6, FIG. 5 is a schematic diagram of top view of an in-cell touch panel according to a second embodiment of the present invention, and FIG. 6 is a schematic diagram of sectional view of partial elements of the in-cell touch panel shown in FIG. 5. The present invention in-cell touch panel 100 comprises a first substrate 102 and a second substrate 104 parallel to each other, wherein both of them are fixed by a sealant 128 and disposed opposite. The sealant 128 is disposed inside the sealant region 106. In order to improve the disadvantage of the conventional touch panel that more active force is required to be applied onto the portion of the conventional touch panel closer to the sealant region for producing sensing signals, the present invention in-cell touch panel 100 comprises pluralities of sensing zones from the central portion to the periphery portion of the display region. For example, the in-cell touch panel 100 comprises a first sensing zone 108 disposed in the central portion of the first substrate 102 and the second substrate 104, a second sensing zone 110 disposed at an out side of the first sensing zone 108, and a periphery sensing zone 112 disposed at an out side of the second sensing zone 110, adjacent to the sealant region 106.

With reference to FIG. 6, the direction of the arrow points the direction from the central portion to the periphery portion of the in-cell touch panel 100. The first sensing zone 108, the second sensing zone 110, and the periphery sensing zone 112 comprise a plurality of first sensor structures 114, a plurality of second sensor structures 116, and a plurality of periphery sensor structures 118 respectively, while FIG. 6 only shows one structure of the tree kinds of sensor structures 114, 116, 118 respectively for description. The first sensor structure 114 includes a first upper sensing electrode 114a and a first lower sensing electrode 114b with a first sensor gap $G_1$ therebetween; the second sensor structure 116 includes a second upper sensing electrode 116a and a second lower sensing electrode 116b with a second sensor gap $G_2$ therebetween; and the periphery sensor structure 114 includes a third upper sensing electrode 118a and a third lower sensing electrode 118b with a periphery sensor gap $G_3$ therebetween. Each first, second and third lower sensing electrodes 114b, 116b, 118b are disposed on surfaces of a first pad structure 120, a second pad structures 122, and a third pad structure 124 respectively. The thickness of the third pad structure 124 is larger than the thickness of the second pad structure 122, while the thickness of the second pad structure 122 is larger than the first pad structure 120. Therefore, the first sensor gap $G_1$ is larger than the second sensor gap $G_2$, and the second sensor gap $G_2$ is larger than the third sensor gap $G_3$. As a result, with comparison to the first sensing zone 108, only a little depressed deformation of the first substrate 112 of the periphery sensing zone 112 is needed to make the third upper sensing electrode 118a contact the third lower sensing electrode 118b in order to produce sensing signals, which reduces the strength of required active force for touch control of the periphery sensing zone 112.

Similar to the first embodiment of the present invention, a sealant 128 is used for fixing the first substrate 102 and the second substrate 104, and a plurality of supporting structures 126 including photoresist spacers 130 and stacked thin film structures 132 are provided for supporting the cell gap between the first substrate 102 and the second substrate 104.

It should be noted that the structures of the supporting structures, such as the stack design of thin-film layers, and each kind of pad structures may be various in different embodiments according to various design of the display panel. For instance, the photoresist spacers may be disposed on the surface of the second substrate, replacing being disposed on the first substrate. In addition, the structure design of the present invention touch panel is not limited to the applications in the previous embodiments, but may be applied to a separate or individual touch control device or other types of display panels. For example, according to the spirit of the present invention, a touch control device may be provided as the following description: the sensor structures of the touch control device may be disposed between two parallel and opposite substrates, whose cell gap are fixed with sealant and supporting structures. The touch control device comprises a plurality of touch sensing areas arranged as an array, and each touch sensing area includes a sensor structure electrically connected to a sensing signal line. There are two or several of sensing zones defined on the touch control device, wherein the sensor structures in different sensing zones have different sensor gaps. According to the touch control device of the present invention, control signals or sensing signals produced by touch can be transferred to an external circuit through the sensing signal line of each touch sensing area so as to control an external device. For example, the touch control device of the present invention may be disposed in front of a monitor or a display device for providing the touch control function.

In contrast to the prior art, the in-cell touch panel of the present invention comprises a plurality of sensing zones, wherein the sensing zone closer to the sealant encloses the sensing zone farther from the sealant, and each sensing zone has a specific different sensor gap according to the distance from the sealant. The less the distance of the sensing zone from the sealant is, the smaller its sensor gap is. Under the design of the structure with a small sensor gap, only a littler deformation of the first substrate is required for producing sensing signals. Therefore, the in-cell touch panel of the present invention has a uniform requirement of active forces of every sensing zone for producing sensing signals that effectively improve the disadvantage of the conventional touch panel that much active force is required for the periphery portion. According to the design structure of the in-cell touch panel of the present invention, no extra fabrication process or material is needed in comparison with the fabrication of the conventional touch control LCD panel. The in-cell touch panel of the present invention is not limited to the LCD panel, but also can be applied to other display panel, such as organic light emitting display (OLED) panel. The designer only needs to slightly amend the original pattern design of thin-film layers in order to fabricate the sensor structures with different sensor gaps. Furthermore, the sensor structures with different sensor gaps and other basic electric elements of the display panel can be fabricated simultaneously through the same manufacture process. Accordingly, the present invention can provide touch control display panel with low cost and with thin and light appearance.

Those skilled in the art will readily observe that numerous modifications and alterations of the device and method may be made while retaining the teachings of the invention.

What is claimed is:

1. A touch panel, comprising:
    a first substrate;
    a second substrate opposite and parallel to the first substrate, the first substrate and the second substrate having a first sensing zone and a second sensing zone, and the second sensing zone enclosing the first sensing zone;
    at least a first sensor structure disposed in the first sensing zone between the first substrate and the second substrate, the first sensor structure having a first sensor gap;
    at least a second sensor structure disposed in the second sensing zone between the first substrate and the second substrate, the second sensor structure having a second sensor gap smaller than the first sensor gap;
    a sealant disposed between the first substrate and the second substrate, enclosing the second sensing zone and positioned out of the second sensing zone; and
    a liquid crystal layer disposed between the first substrate and the second substrate and enclosed by the sealant.

2. The touch panel of claim 1, wherein the first sensor structure comprises a first upper sensing electrode and a first lower sensing electrode, the second sensor structure comprises a second upper sensing electrode and a second lower sensing electrode, the first upper sensing electrode and the second upper sensing electrode are disposed on a surface of the first substrate, and the first lower sensing electrode and the second lower sensing electrode are disposed on a surface of the second substrate.

3. The touch panel of claim 2, wherein a spacing between the first upper sensing electrode and the first lower sensing electrode is defined as the first sensor gap and a spacing between the second upper sensing electrode and the second lower sensing electrode is defined as the second sensor gap.

4. The touch panel of claim 3, further comprising a common electrode disposed on the surface of the first substrate, wherein the first upper sensing electrode and the second upper sensing electrode comprise a portion of the common electrode respectively.

5. The touch panel of claim 1, further comprising:
    at least a first pad structure, disposed in the first sensing zone between the first substrate and the second substrate; and
    at least a second pad structure disposed in the second sensing zone between the first substrate and the second substrate, a thickness of the second pad structure being larger than a thickness of the first pad structure.

6. The touch panel of claim 5, wherein the first pad structure and the second pad structure respectively correspond to the first sensor structure and the second sensor structure.

7. The touch panel of claim 5, wherein the first pad structure and the second pad structure respectively comprise a conductive layer.

8. The touch panel of claim 7, wherein the second pad structure further comprises a passivation layer.

9. The touch panel of claim 5, wherein the first sensor structure and the second sensor structure respectively comprise a transparent conductive layer disposed on a surface of the first pad structure and a surface of the second pad structure.

10. The touch panel of claim 1, wherein the first and second substrates further have a periphery sensing zone, the touch panel further comprises at least a periphery sensor structure disposed in the periphery sensing zone between the first substrate and the second substrate, and the periphery sensor structure has a third sensor gap smaller than the second sensor gap.

11. The touch panel of claim 10, wherein the second sensing zone is disposed between the periphery sensing zone and the first sensing zone.

12. The touch panel of claim 1, further comprising a plurality of display regions.

13. The touch panel of claim 12, further comprising a plurality of pixels disposed in the display regions.

14. The touch panel of claim 1, further comprising at least a supporting structure disposed between the first substrate and the second substrate.

15. The touch panel of claim 14, wherein the supporting structure comprises a photoresist spacer.

16. The touch panel of claim 14, wherein the supporting structure comprises a plurality of stacked thin-film layers.

17. A touch control device, comprising:
    a first substrate;
    a second substrate opposite and parallel to the first substrate, the first substrate and the second substrate having a first sensing zone and a second sensing zone, and the second sensing zone enclosing the first sensing zone;
    at least a first sensor structure disposed in the first sensing zone between the first substrate and the second substrate, the first sensor structure having a first sensor gap;
    at least a second sensor structure disposed in the second sensing zone between the first substrate and the second substrate, the second sensor structure having a second sensor gap smaller than the first sensor gap; and a sealant disposed between the first substrate and the second substrate, enclosing the second sensing zone and positioned out of the second sensing zone.

18. The touch control device of claim 17, wherein the first sensor structure comprises a first upper sensing electrode and a first lower sensing electrode, the second sensor structure comprises a second upper sensing electrode and a second lower sensing electrode, the first upper sensing electrode and the second upper sensing electrode are disposed on a surface of the first substrate, and the first lower sensing electrode and the second lower sensing electrode are disposed on a surface of the second substrate.

19. The touch control device of claim 18, wherein a spacing between the first upper sensing electrode and the first lower sensing electrode is defined as the first sensor gap, and a spacing between the second upper sensing electrode and the second lower sensing electrode is defined as the second sensor gap.

20. The touch control device of claim 17, further comprising at least a first pad structure and a second pad structure disposed between the first substrate and the second substrate, respectively corresponding to the first sensor structure and the second sensor structure, and a thickness of the second pad structure being larger than a thickness of the first pad structure.

21. The touch control device of claim 20, wherein the first sensor structure and the second sensor structure respectively comprise a transparent conductive layer disposed on a surface of the first pad structure and a surface of the second pad structure.

22. The touch control device of claim 17, wherein the first substrate and the second substrate further has a periphery sensing zone, the touch control panel further comprises at least a periphery sensor structure disposed in the periphery sensing zone between the first substrate and the second substrate, and the periphery sensor structure has a third sensor gap smaller than the second sensor gap.

23. The touch control device of claim 22, wherein the periphery sensing zone is adjacent to the sealant.

24. A touch control device, comprising:
a first substrate;
a second substrate opposite and parallel to the first substrate, the first substrate and the second substrate having a first sensing zone and a second sensing zone, and the second sensing zone being positioned at an outside of the first sensing zone;
a sealant disposed between the first substrate and the second substrate, enclosing the second sensing zone and positioned at an outside of the second sensing zone, wherein the second sensing zone is closer to the sealant than the first sensing zone;
at least a first sensor structure disposed in the first sensing zone between the first substrate and the second substrate, the first sensor structure having a first sensor gap; and
at least a second sensor structure disposed in the second sensing zone between the first substrate and the second substrate, the second sensor structure having a second sensor gap smaller than the first sensor gap.

25. The touch control device of claim 24, wherein the second sensing zone encloses the first sensing zone.

26. The touch control device of claim 24, wherein the first sensor structure comprises a first upper sensing electrode and a first lower sensing electrode, the second sensor structure comprises a second upper sensing electrode and a second lower sensing electrode, the first upper sensing electrode and the second upper sensing electrode are disposed on a surface of the first substrate, and the first lower sensing electrode and second lower sensing electrode are disposed on a surface of the second substrate.

27. The touch control device of claim 26, wherein a spacing between the first upper sensing electrode and the first lower sensing electrode is defined as the first sensor gap, and a spacing between the second upper sensing electrode and the second lower sensing electrode is defined as the second sensor gap.

28. The touch control device of claim 24, further comprising at least a first pad structure and a second pad structure disposed between the first substrate and the second substrate, corresponding to the first sensor structure and the second sensor structure respectively, a thickness of the second pad structure being larger than a thickness of the first pad structure.

* * * * *